United States Patent [19]
Taylor et al.

[11] Patent Number: 5,278,608
[45] Date of Patent: Jan. 11, 1994

[54] ELECTRONICALLY PRINTED DEPTH PHOTOGRAPHY SYSTEM WITH IMPROVED VIEWING RANGE

[75] Inventors: Roy Y. Taylor, Scottsville; Sergei V. Fogel, Rochester, both of N.Y.

[73] Assignee: Eastman Kodak Company, Rochester, N.Y.

[21] Appl. No.: 885,699

[22] Filed: May 19, 1992

[51] Int. Cl.⁵ .................. G03B 27/32; G03B 35/14
[52] U.S. Cl. .................... 355/22; 354/112; 354/114; 355/77
[58] Field of Search .......... 355/22, 77; 354/112, 354/114

[56] References Cited

U.S. PATENT DOCUMENTS

| | | | |
|---|---|---|---|
| 4,417,784 | 11/1983 | Knop et al. | 350/162.19 |
| 4,552,442 | 11/1985 | Street | 354/112 |
| 4,650,282 | 3/1987 | Lo | 350/130 |
| 4,674,853 | 6/1987 | Street | 354/112 |
| 4,724,449 | 2/1988 | Wright | 354/112 |
| 4,800,407 | 1/1989 | Wah Lo | 354/114 |
| 4,956,705 | 9/1990 | Wright | 358/88 |
| 4,987,487 | 1/1991 | Ichinose et al. | 358/92 |
| 5,059,771 | 10/1991 | Ip et al. | 235/64.7 |
| 5,063,441 | 11/1991 | Lipton et al. | 358/88 |
| 5,084,763 | 1/1992 | Naradate et al. | 358/88 |
| 5,113,213 | 5/1992 | Sandor et al. | 355/22 |

OTHER PUBLICATIONS

"Nimslo system adds a new dimension to 3-D photography" by Jerry Nims and Allen Lo, pp. 20-23, Aug. 1980, *Industrial Photography*, vol. 29, No. 8.

Primary Examiner—Richard A. Wintercorn
Attorney, Agent, or Firm—Edward Dugas

[57] ABSTRACT

A system and method that determines a number of scan lines for each image of a view using a resolution of the recording media, a pitch of the lenticules and a number of views needed to minimize angular transitions between views. The viewing range is also increased by allowing the primary visual field to be offset with respect to the projection field of the lenticules such that the image lines can be positioned under lenticules adjacent to the lenticule projecting the image lines as the distance from a central viewing position increases.

12 Claims, 6 Drawing Sheets

ELECTRONICALLY PRINTED DEPTH PHOTOGRAPHY SYSTEM WITH IMPROVED VIEWING RANGE

CROSS REFERENCE TO RELATED APPLICATIONS

This application is related to U.S. applications entitled Electronically Printed Interpolated Integral Photography System having U.S. Ser. No. 07/722,713 Method And Apparatus For Optimizing Depth Images By Adjusting Print Spacing having U.S. Ser. No. 885,705 filed May 19, 1992, and Method And Apparatus For Aligning Depth Images having U.S. Ser. No. 885,411 filed May 19, 1992 all incorporated by reference herein.

BACKGROUND OF THE INVENTION

1. Field of the Invention

The present invention is directed to the field of depth images and, more particularly, to a system that produces a lenticular image with improved viewing range and in which thickness of a lenticular faceplate or overlay applied directly to the image recording media is determined for the improved viewing range.

2. Description of the Related Art

Three-dimensional photography is comprehensively described in Three-Dimensional Imaging Techniques by Takanori Okoshi (New York: Academic Press, 1976, translated from the Japanese edition published in 1972) which provides a basis for describing the attributes and advantages of the present invention. Okoshi distinguishes between truly three-dimensional imaging and stereoscopic imaging. Integral photography is a method of recording a complete three dimensional spatial image, that is, one viewable from a multiplicity of directions, upon a single flat photographic plate. Integral photography refers to the composition of the overall image as an integration of a large number of small photograph image components. Each photographic image component is viewed through a separate small lens usually formed as a part of a mosaic of identical spherically-curved surfaces embossed or otherwise formed on the front surface of a plastic sheet. The plastic sheet is subsequently bonded to or held in close contact with the emulsion layer containing the photographic image components.

A lenticular photograph is a special case of an integral photograph where the small lenses have cylindrical refracting surfaces running the full extent of the print area in the vertical direction. The long cylindrical lenses are called lenticules, and the principles of integral photograph apply equally well to lenticular photography as long as one views the layouts or optical schematics in planes perpendicular to the cylindrical axis of the lenticule refracting surfaces. An optical method of making lenticular photographs is described by Okoshi in Chapter 4 of the aforementioned book. A photographic camera is affixed to a carriage on a slide rail and a series of pictures is taken in which the camera is translated between subsequent exposures in equal increments from a central perspective location to lateral perspective locations on either side of the central perspective location. The distance that the lateral perspective locations are displaced from the central perspective location is dependent upon the maximum angle through which the lenticular material can project photographic image components contained behind any given lenticule before it begins to project photographic image components of other portions of the image contained behind an adjacent lenticule. The sum of the total number of views contained between and including the extreme lateral perspective locations is limited by the resolution of the photographic emulsion which can be contained behind each lenticule and the optical characteristics of the lenticular faceplate.

In accordance with Okoshi, the negatives resulting from each of these views are then placed in an enlarger equipped with a lens of the same focal length as the camera lens. In making the print, an assemblage is made of a sheet of unexposed photographic material oriented with its emulsion side in intimate contact with the flat side of a lenticular faceplate, i.e., a clear plastic sheet having parallel cylindrical refracting surfaces embossed or otherwise formed into its front side. The assemblage is placed on the enlarger easel with the lenticular side facing the enlarger lens and the orientation of the cylindrical axes being adjusted normal to the direction of perspective shift in the views. The position of this assemblage on the easel is adjusted until the field of the central image is centered on the center of this assemblage, and an exposure of the information being projected out of the enlarger lens is made through the lenticules onto the photographic emulsion. Subsequently, negatives from the successive exposures are placed in the film gate and the position of this assemblage is readjusted on the easel in the same direction as the perspective shift in the views to reposition each respective view to the center of the assemblage, and additional exposures of the information being projected from the enlarger lens are made. When all the views contained between the lateral vantages have been exposed on the emulsion through the lenticular plastic sheet, the film sheet is separated from the lenticular plastic sheet and developed. When the aperture of the enlarger lens is set to equal the amount of lateral shift between alternate views, the space behind each lenticule will be found to be exactly filled with photographic image components. The final step in this process is to again reassemble the developed photographic print media and the lenticular faceplate with intimate contact between the emulsion layer and the flat side of the faceplate, with the faceplate so positioned laterally that the long strips of adjacent images resulting from exposures through the cylindrical lenticules are again positioned in a similar manner under the lenticules for viewing. This method of image recording is called an "indirect" technique because the final print recording is indirectly derived from a series of two-dimensional image recordings. Because the exposure of the recording media is performed through the lenticular faceplate before the media is developed and attached to the faceplate, no consideration need be given to the thickness of the overlay material necessary for properly focussing the images toward the viewer.

Because the successive exposures in the prior art are performed in a fixed position with a restricted fixed field aperture, the image components align directly under the corresponding lenticules and the viewing range of prints created by this method is limited.

Ideally, an integral or lenticular photograph would display an infinite number of different angular views from each lenslet or lenticule to create an infinitely smooth viewing transition as is experienced in real life when viewing the world. This is practically impossible since each angular view much have a corresponding small finite area of exposed emulsion or other hard copy media which is its source of display. Consequently, as an upper limit, the number of views must not exceed the resolution limit of the hard copy media, and, perhaps practically more significantly, must not exceed the resolving power of the lenticules.

In addition to a lenticular faceplate, horizontal image separation may also be provided through raster occlusion, such as by using a Ronchi ruling on a faceplate spatially located in front of the composite print, so as to prevent the images intended for viewing by the right eye from being seen by the left eye and vice versa. The technique of raster occlusion is described in textbooks such as Foundations of the Stereoscopic Cinema by Lenny Lipton (New York: VanNostrand Reinhold, 1982, pages 74, 166, 287) and Stereoscopy by N. A. Valyus (Focal Press, 1966) and is the preferred embodiment of the International Patent Application publication number WO 90/08343 (Jul. 26, 1990) filed by D. J. Sandin, E. R. Sandor, W. T. Connally, and S. B. Meyers. Compared to lenticular methods, however, raster occlusion or barrier technology suffers from the additional problem of reduced image brightness. While the Sandin application mentions the use of a spacer with lenticulation on one side as a viewing device and is an "indirect" method, there is no discussion of or recognition of the conditions necessary to put this into practice.

U.S. Pat. Nos. 4,552,442 and 4,674,853, naming Graham S. B. Street as inventor, teach a "direct" method of recording images with correct angular correlation. In this method, the converging bundle of optical rays from a very large aperture camera lens is directed onto a sheet of lenticular material to which photographic film has been affixed in the same manner as described in the previously mentioned projection method. In optical terms, the apertures of the respective lenslets form the sub-apertures which sample the taking lens aperture. Left-right image correspondence is properly established by reflecting the converging beam from a beamsplitter onto a retroreflecting surface prior to reaching the lenticular assemblage. In the geometric space between the object field and the taking lens, different aperture coordinates, or positions on the aperture of the taking lens represent different perspectives of the object field. Bundles of light rays leaving the taking lens from localized sub-apertures within the taking lens aperture are relayed by different lenslets on the lenticular film array to the photographic emulsion optical reflections, and result in the need for a uniformly accurate retroreflector sheet with elements not substantially larger than the display print lenticules. Moreover, the depth of field of the camera lens severely limits the photographic space, and the camera itself is extremely large, necessitating the use of large format film sheets for each copy and a shutter means of very large aperture.

The Sandin application also illustrates a different technique for creating a three-dimensional image using a printer to electronically record the image on the recording media. However, no consideration is given to determining the proper spacer thickness for various printer scan line resolutions. As in the optical printing method, the image lines are restricted or limited to being aligned directly under the corresponding projection means.

SUMMARY OF THE INVENTION

It is an object of the present invention to increase the viewing range of depth images.

It is another object of the present invention to allow lenticular faceplates of varying thicknesses to be used with electronically printed image recording media.

It is also an object of the present invention to provide a lenticular image with a sufficiently large number of views to provide inconspicuous angular transitions between views.

It is a further object of the present invention to vary the number of scan lines used for each image line of a view under a lenticule in accordance with the lenticular pitch and thickness.

It is a further object of the present invention to utilize any combination of conventional photographic and electronic cameras and computers generating image files as sources for image acquisition while retaining as much photographic space as is possible in terms of both the depth dimension and ambient light conditions, thus allowing for hard copy prints of varying magnifications from a variety of camera formats.

The above objects can be attained by a system that determines the number of scan lines for each image of a view based on the resolution of the recording media, the number of or pitch of the lenticules and the number of views desired or necessary to minimize the angular transitions between views. The viewing range is also increased by aligning the image lines with respect to the lenticules such that the image lines can be positioned under adjacent lenticules as the distance from a central viewing position increases.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
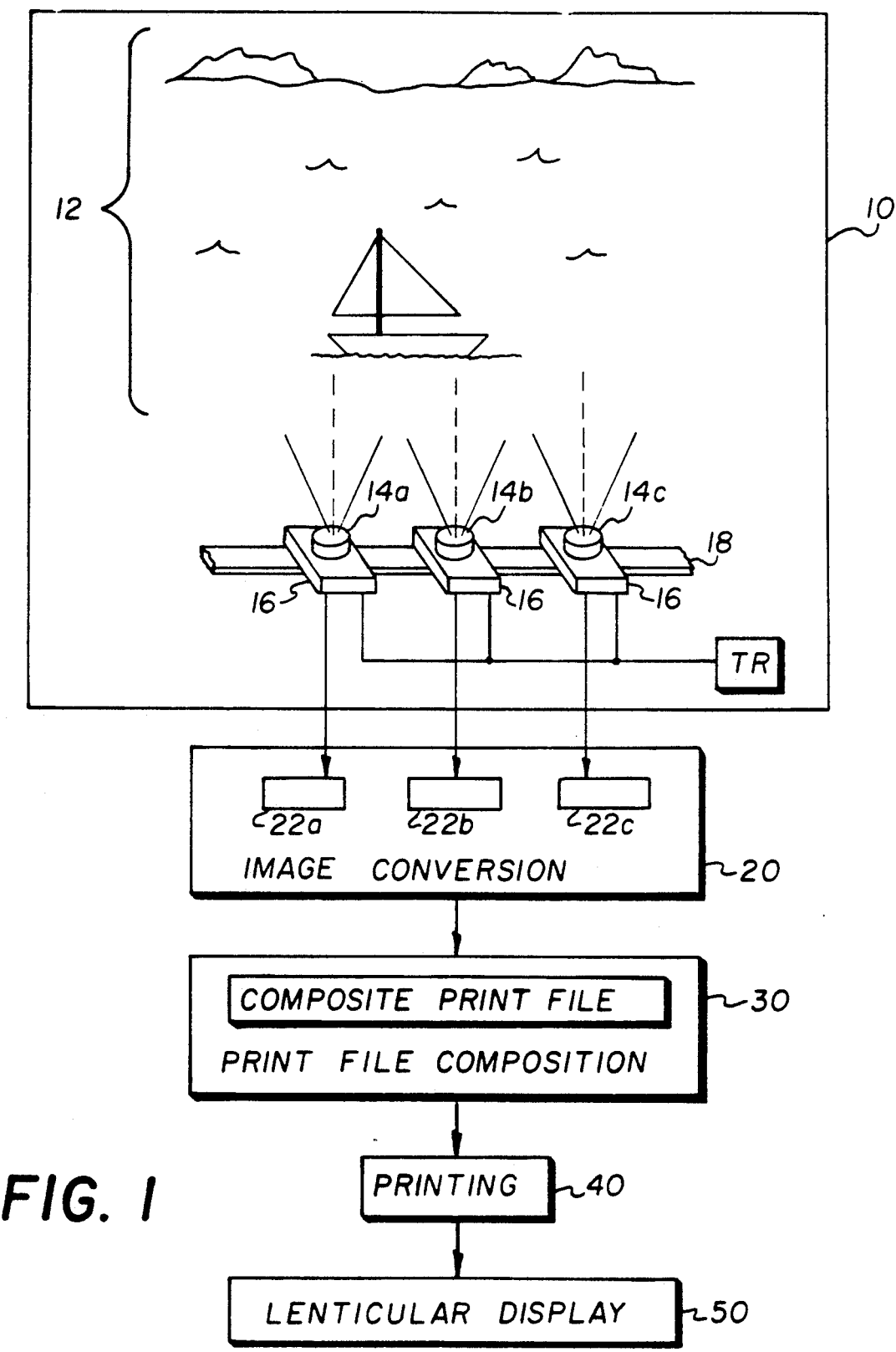
FIG. 1 illustrates the components of the present invention.

FIG. 1 depicts the image capture and processing components of the present invention. A brief review of these components will be provided while a detailed discussion of the components can be found in the related integral photography application previously mentioned.

The first component, an image generation system 10, captures an actual three-dimensional scene 12 photographed by conventional (photographic or electronic) cameras 14a, 14b, 14c each aligned beforehand by the photographer on, e.g., separate carriages 16 affixed to a slide rail 18 to simultaneously capture different perspective of the scene. The slide rail 18 allows the carriages 16, and the cameras 14a, 14b, 14c associated therewith, to be positioned or translated in a horizontal direction normal to the direction of the desired scene 12. Other scene capture arrangements such as a slidable single camera on a camera with multiple lenses can be used. In the second image conversion component 20 the resulting negatives (or, in the case of an electronic sensor, the image-related charge on the picture elements) from the cameras are electronically converted to digital image signals representing digital bit-maps 22a, 22b, 22c of the actual images provided at each actual perspective by the respective cameras 14a, 14b, and 14c. Each bit map is a representation of the image in which each picture element (pixel) is represented by bits stored in memory. A negative converter such as the Nikon LS3500 scanner available from Nikon is preferred when film negatives are being converted. Lenticular image generation involves the generation 30 of a composite print file 32, the printing 40 of that file, and the display 50 of the resultant copy. In the fourth component 40 a composite bit-map file 42 is compiled from the actual image signals. The composite file contains strips of data elements corresponding to the strips of photographic elements from the different perspectives that make up the ultimate lenticular photograph. The operations performed component 20-40 are preferably performed by a computer such as the VAX 4000 available from Digital Equipment Corporation. In the fifth component 50, a print emulsion or other hard copy media (transparent or reflective) is exposed by an electronic or optical printer which projects pixels or otherwise exposes pixels on the print media in correspondence to the signals in the composite print file 32. An electronic printer has an advantage over the optical printing of the prior art since aberrations in the lenticule do not affect printing spot size. The preferred printer is the LVT Model 1620B available from Eastman Kodak Co. Other printers such as the Cymbolic Science International Fire 100 printer can of course be used. In the sixth component 50 the print (or duplicate thereof) is displayed through a series of lenticules with a spatial pitch typically equal to the maximum number of views times the pixel pitch on the print media.

The lenticular faceplate or overlay is positioned in a confronting relationship to the print and can be clamped or glued in place. The thickness of the overlay and the spacing or pitch of the lenticules vary from manufacturer to manufacturer. A print produced for one thickness or pitch overlay will not project a good image when the thickness or pitch of the overlay actually used is different. Further, since the means of displaying the composite print image depends on the lenticular faceplate, and because the effectiveness of the display depends on providing as many alternative perspectives as possible while simultaneously not exceeding the spatial pixel density of the printer-media combination or the like lenticule resolution, as well as keeping the lenticules small to reduce the distraction of their features, a review of the basic mathematics and geometry of the lenticular display is appropriate.

Figure 2:
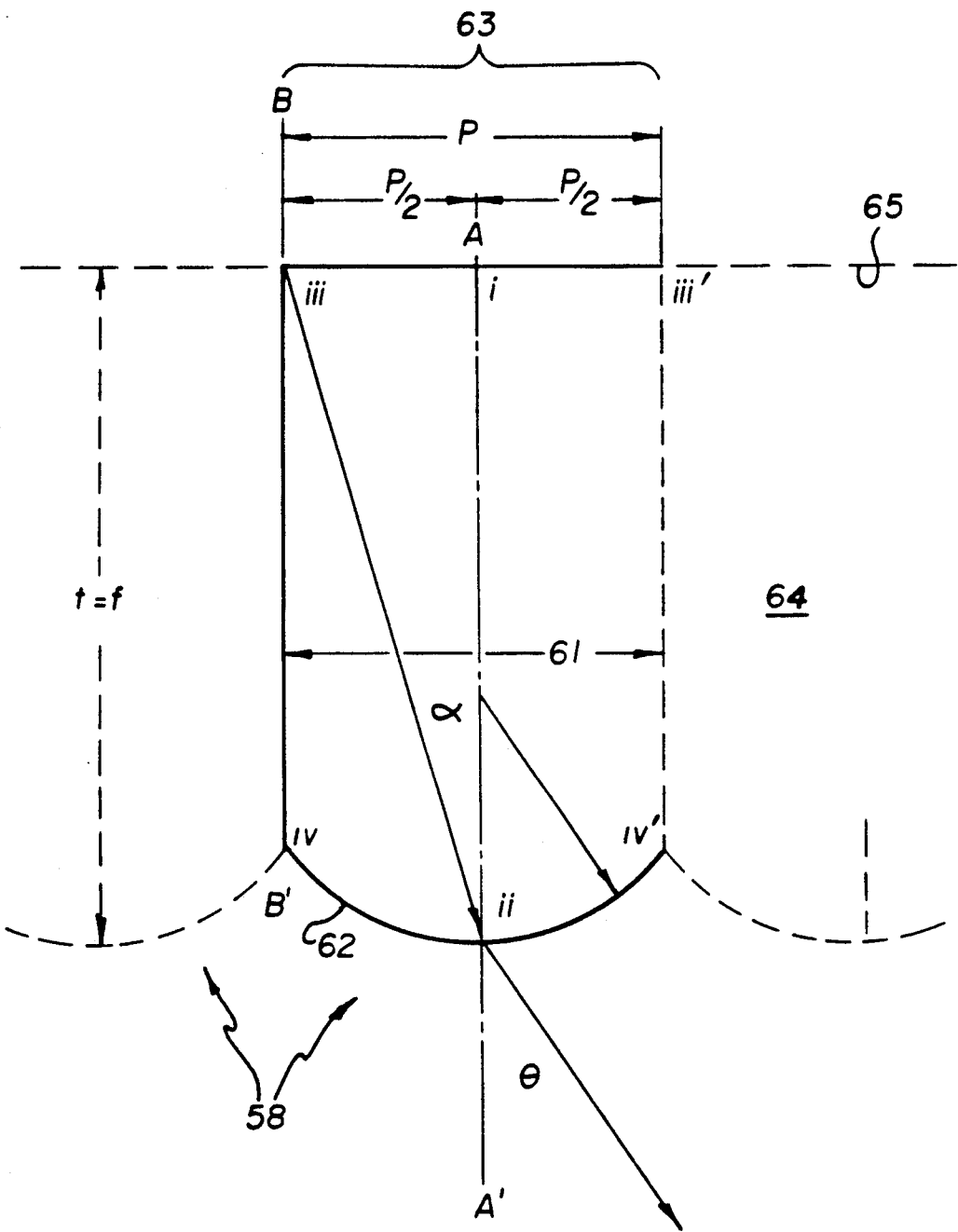
FIG. 2 depicts lenticule geometry.

The geometry of a single lenticule is shown in FIG. 2. The thickness t of each lenticule 58 is equal to its focal length f. This is achieved by molding or embossing a curved surface 62 of appropriate radius r on the front surface of a plastic sheet 64 of index of refraction n. The radius r and thickness t are governed by:

$$r = t(n-1)/n \qquad (1)$$

where f=t. The width of the lenticule is p and is analogous to spatial pitch. At the center of the lenticule, an imaginary line A-A', at a distance p/2 from either edge, can be drawn normal to the flat back surface 65 of the faceplate 64. This intersection point with the back surface 65 is labelled point i. Line A-A' intersects the curved surface 62 on the front surface at point ii and is normal to the curved surface at point ii. By geometry, the center of the curvature of the curved surface 62 will lie on line A-A'. A second imaginary line B-B' parallel to A-A' can be drawn from the left edge of the curved surface at the point where this lenticule ends and the nominally identical adjacent lenticule begins. Line B-B' intersects the flat back surface 64' at point iii. If an optical ray is drawn from point iii to point ii, it forms an angle with line A-A'. By Snell's Law this optical ray will be refracted to a new angle which is related to the input angle of incidence $\alpha$ as follows:

$$\alpha = arcsin\ ((sin\ \theta)/n) \qquad (2)$$

where n is the index of refraction of the sheet 64. By trigonometry:

$$\alpha = arctan\ (p/2f) \qquad (3)$$

Substituting Equation (3) into Equation (2) and solving for $\theta$:

$$\theta = arcsin\ (n*sin(arctan\ p/2f))) \qquad (4)$$

results in the angle $\theta$ as illustrated in FIG. 2. The angle $\theta$ is the maximum angle through which the lenticular material 64 can project photographic image components contained directly behind any given lenticule. This in turn, in accordance with the teachings of Okoshi, §4.3.3, helps define the maximum displacement between the respective cameras 14a, 14b, 14c on the slide rail 18 for orthoscopic viewing (See FIG. 1).

The region 63 of the recording media on which the images to be projected by the curved surface 62 of the lenticule is called the primary visual field 63. This region in FIG. 2 is defined as iii-iii'. The primary projection field 61 of each lenticule is a portion of the curved surface through which the images can be projected to a viewer. In FIG. 2 the primary projection field 61 for the visual field 63 is typically defined by iv-iv' which aligns with the edges of the refracting surfaces of the lenticule. In barrier or Ronchi ruling displays the primary projection field is defined by the centers of the opaque barriers. In FIG. 2 the primary projection field 61 and the primary visual field 63 are of the same width and aligned.

Figure 3:
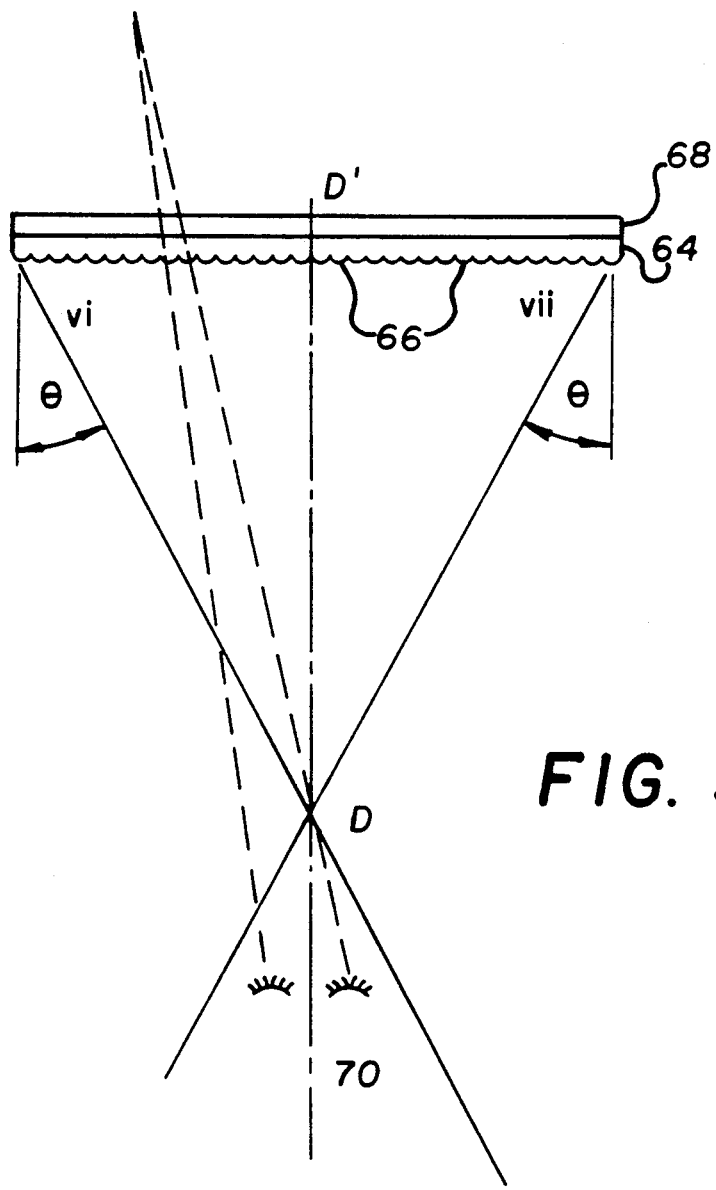
FIG. 3 shows a section of a lenticular faceplate or overlay.

FIG. 3 illustrates a typical section of lenticular faceplate material 64 as seen from a cross-section normal to the cylindrical axes of the lenticules 66. The lenticules are all of the same nominal focal length and thickness as derived from Equation (4) and the print media 68 is positioned behind the lenticular array 64 at an optical distance substantially equal to this focal length. Lines are drawn from the points vi and vii at edges of the lenticular faceplate 64 at angles $\theta$ and $-\theta$, respectively, and intersect at point D in front of the faceplate 64. The lines correspond to the center points ii of FIG. 2 for the last lenticule to the extreme left and right of the display, respectively. A line D-D' perpendicular to the back surface 65 of the faceplate is drawn from this intersection. Point D then is the best absolute viewing position. However, if D' is considered the zero point on a distance scale measured from the faceplate 64 and if both of the viewer's 70 are placed anywhere between the lines D-vi and D-ii at a distance beyond D, unique information can be displayed to each eye from any point on the faceplate, with the consequent potential of depth perception and look around capability.

The generation of the composite print file used for lenticular faceplate viewing can be visualized by considering the concept of a scene window. Consider that the original object scene was being viewed through a window in an otherwise opaque wall. The multiple camera perspectives represent information of the object scene as would be seen from different angular positions in front of the scene window. Information available from the various image files for anything other than falling within the window apertures would be discarded. If the lenticular print were now placed in the aperture of the scene window and was the same size as the scene window, a unity model of the object scene would result if the information behind each lenticule was properly printed from all of the camera perspectives. Each point in the scene window would have an infinite number of angular lines of sight possible, while each point in the lenticular print has a finite number of angular lines, limited by the spatial pitch of the pixels of the display media and the spatial pitch of the lenticules.

Figure 4:
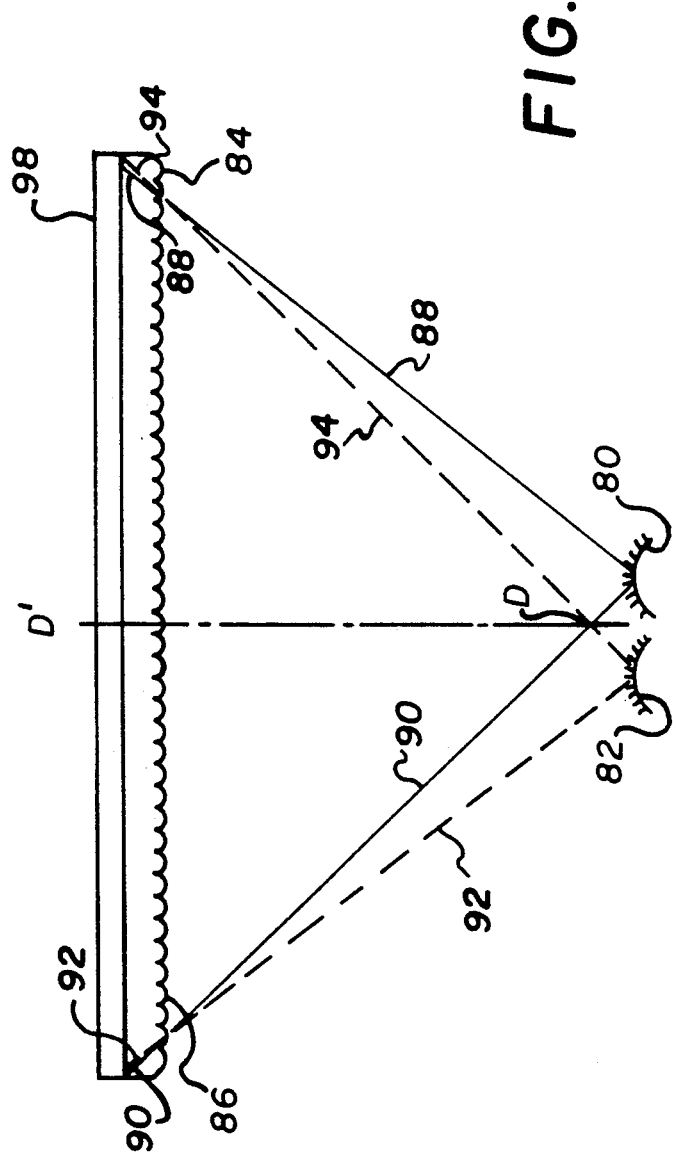
FIG. 4 shows viewing of the lenticular image by an observer.

FIG. 4 shows the eyes 80 and 82 of a human observer viewing a lenticular print. If the observer is to gain a depth perception experience of a scene, it is necessary that his right eye 80 see contiguous image lines of a right perspective of the scene while the left eye 82 see contiguous images lines of a left perspective of the same scene. Considering lenticules 84 and 86 which are the extreme righthand and lefthand lenticules, respectively, in the lenticular print, lines can be from the from the front nodal points of the eyes to the centers of these respective lenticules. These lines represent optical rays along which the waves of light progress. These rays are refracted at the cylindrical surfaces as discussed earlier by amounts determined by Snell's Law and intersect the photographic emulsion which is maintained in contact with the rear surface of the lenticular faceplate. The optical ray between the right eye 80 and the rightmost lenticule 84 intersects the emulsion at point 88, the ray between eye 80 and the lenticule 86 intersects the emulsion at point 90, and similarly rays between the left eye 82 and lenticules 84 and 86 intersect the emulsion at points 92 and 94, respectively. It is important to note that the rays which traverse to the right eye consistently intersect the emulsion to the left of the intersections of rays which traverse to the left eye. This geometric analysis can be performed for any of the unnumbered lenticules falling between lenticules 84 and 86 and in each case the rays traversing the right eye would intersect to the left of the rays traversing the left eye. Since each lenticule is contiguous with the ones to its right and left, the scene will be contiguous for each eye if the information recorded on the emulsion at points 88, 90, 94, 92 and the similar ray intersections from the unnumbered lenticules has been sampled from the original right and left perspectives in an unreversed manner. The sampling structure matches the number of lenticules present in the lenticular print. Consequently, if the lenticular print is intended to encompass M lenticules then the right and left perspective images must be sampled M times. One method which will accomplish this result is to count the number of scan or image lines S falling between the window limits in a perspective image (having previously scanned the image at a scan line density greater than the lenticule density), and determine the quotient:

$$S/M \qquad (5)$$

The sampling structure f(s) would be to use the data in scan lines:

$$f(S) = [\text{integer}(1*(S/M)), \text{integer } (2*(S/M)), \text{integer} \\ (3*(S/M)), \ldots, \text{integer } (M*(S/M))] \qquad (6)$$

where (f(S)) is f(S) rounded to the nearest integer.

Figure 5:
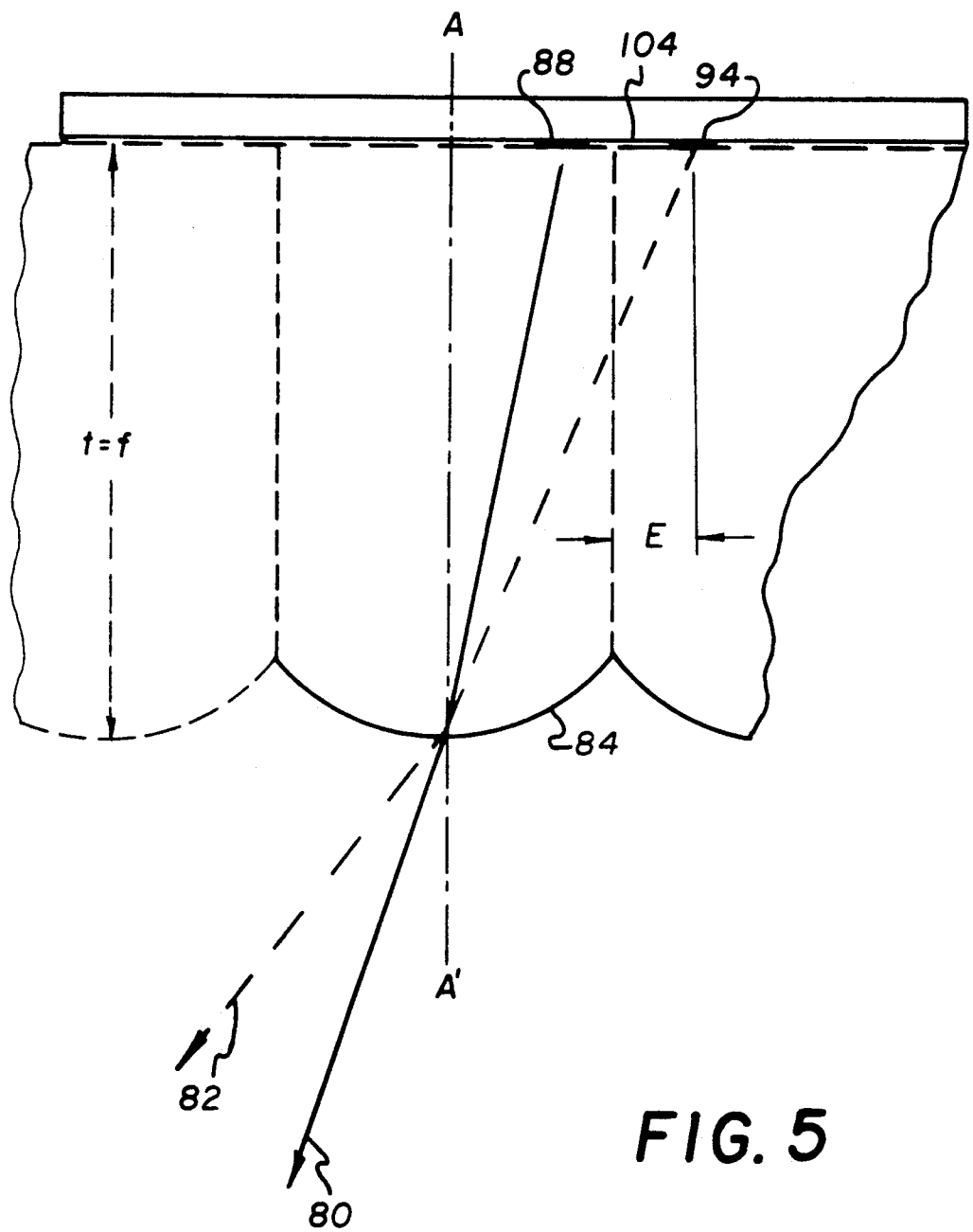
FIG. 5 depicts optical rays in a lenticular imaging device.

The sampled information from the right perspective views will always fall to the left of the sampled information from the left perspective views and can be visualized in FIG. 5 which is a closeup view of lenticule 84, but by analogy is typical of any of the lenticules. Sampled and recorded image lines from right and left perspectives are located at the intercepts 88 and 94 respectively. The widths of these recorded image lines are determined by the number of scan lines used to create an image line and the writing dot widths of the film printer used. The unexposed space 104 between the image lines 88 and 94 is available for recording other perspectives which could be seen from a vantage point between eye positions 80 and 82 of FIG. 5. These vantage points become visible when the observer moves laterally, e.g., if the observer is moved slightly to the right, the left eye will move into a vantage point between positions 80 and 82. As already discussed earlier, the order of recording these additional vantage points on the emulsion would be inverse to the scene information and because current film recorders work at a constant printing pitch (also called printing resolution), the number of internal views that can be recorded and even the exact separations of image lines 88 and 94 are subject to printing resolution constraint.

FIG. 5 also illustrates a situation which seems to contradict the earlier suggestion that the emulsion lying directly behind a given lenticule will be reserved for that lenticule. Notice that image line 94 lies to the right of the lenticule 84 through which the image line 94 is projected. FIG. 5 illustrates a situation in which the primary visual field extends outside of or is displaced with respect to the primary projection field. That is, the primary visual field is not aligned with the lenticule 84. An offset of the distance E exists between the primary visual field and the primary projection field. If the display is intended for the observer to move his head laterally to left of eye vantage points 80 and 82, this would require additional information to be recorded even further right than line 94 of FIG. 5. It has been determined that the first order display angles $\theta$ and $-\theta$ of FIG. 2 can be exceeded by recording with a printing pitch multiple which exceeds the lenticular pitch as long as the conditions of display are taken into account. Letting the number of perspectives or views to be recorded per lenticule equal k, then the first order lenticule width will be:

$$P = k*u \qquad (7)$$

where u is the width of one recorded image line or scan line if a single scan line is used to create an image line.

Figure 6:
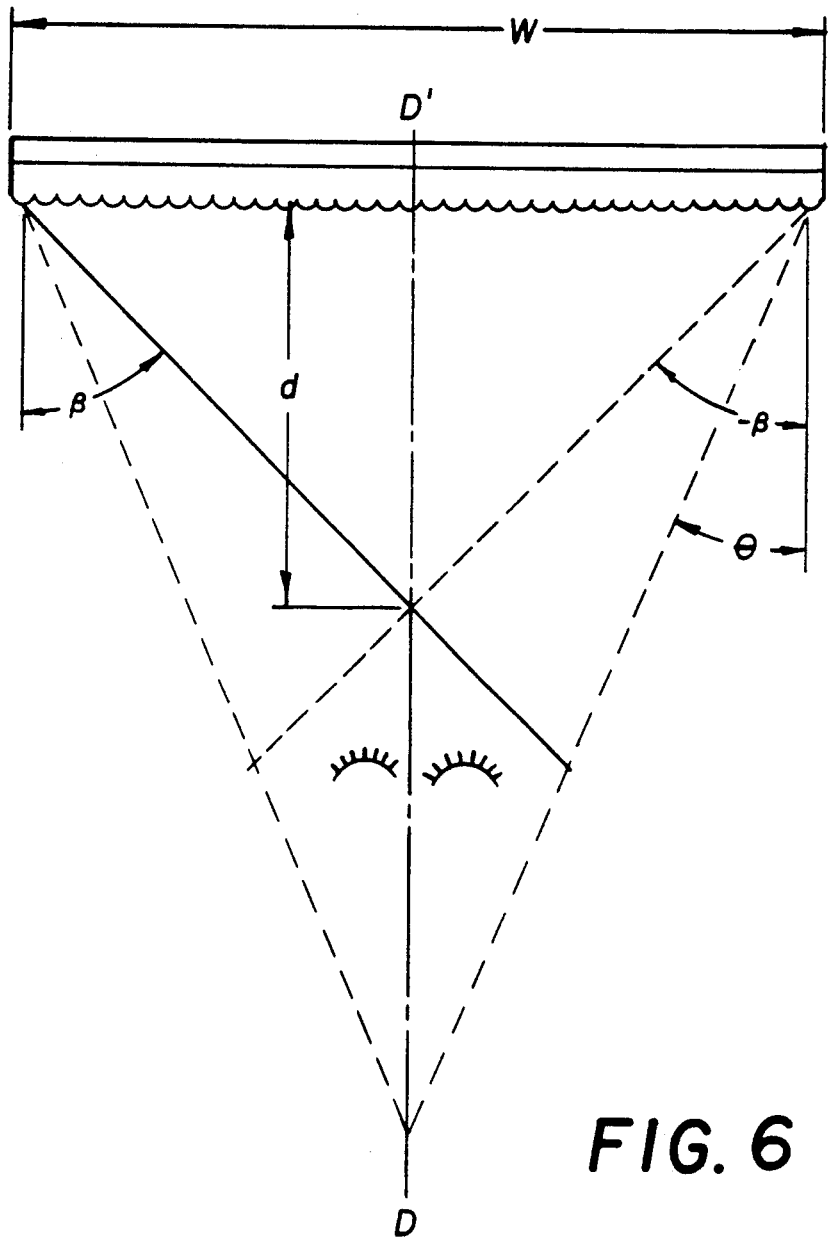
FIG. 6 depicts a lenticular image with an increased angular viewing range.

FIG. 6 is similar to FIG. 2 except that V, angles $\beta$ and $-\beta$ of FIG. 6 are greater than angle $\theta$ and $-\theta$ of FIG. 2. This creates the need to record information for at least one lenticule on the emulsion at a point which lies laterally beyond that which is directly behind that lenticule. The advantage of this display is that the observer can move closer to the image and still see complete perspective views with both eyes, i.e., distance D-D' can be reduced. The angle $\beta$ is governed by:

$$\beta = \arctan(W/(2*d)) \qquad (8)$$

where W is the width of the lenticular print and d is the distance (minimum desired distance) between points D and D' of FIG. 6. An optical ray intersecting a lenticule at angle $\beta$ will be refracted to angle $\beta'$:

$$\beta' = \arcsin((\sin \beta/n) \qquad (9)$$

The amount that the last recorded line of information associated with an outermost lenticule is located beyond the extend of the lenticule is shown in FIG. 5 as E:

$$E = f*\tan(\beta') \qquad (10)$$

where f equals the thickness t of the lenticule and is a result of a gradual accumulation of phase difference between the lenticular pitch and the printing pitch necessary for the reduced viewing distance such that:

$$E = ((M/2)*(k*u)) - ((M/2)*P') \qquad (11)$$

where P' is final lenticular pitch which will provide a display which can be viewed completely from the closer distance d. The final lenticular pitch P' is:

$$P' = (k*u) - ((f*\tan(\beta'))/(M/2)) \qquad (12)$$

Of the above equations equation 10 can be used to determine the position or drift associated with each lenticule, thereby providing a non-linear position or drift for each set of image lines associated with a lenticule.

A number of ways exist which can be used to adjust the relative position between image lines to allow an image line to be positioned outside the lenticule through which it projects and before or while making hard copy representations of a print file. One way is to provide a print head held in close proximity to the photosensitive film emulsion. Such a head as that provided by Nutec Inc. of New Jersey comprising a line of the output ends of optical fibers each of which is individually illuminated at its input end by a tungsten source, LED'S, or a specific pixel location on a CRT screen. A relative motion perpendicular to the print head line is imparted between the film emulsion carrier and the print head while changes are made to the illumination sources in accordance with the print file densities at each location along the print head line. A second method is to direct laser beams, modulated by the image information of the print file, onto a rotating polygon of plano-optical facets which causes the reflected beam to repeatedly scan across the photosensitive material while the material is slowly advanced through an exposure gate. Adjustment of the mirror position to allow differential image line spacing is also accomplishable by those of skill in the art. A third and preferred method for this application is electronic scan printing using the Eastman Kodak Co. printer previously mentioned. In this method, a combination of red, blue, and green optical beams is combined by mirrors and beamsplitters into a single beam which is focused onto the photosensitive surface by a high quality (or diffraction limited) lens, like a microscope objective. The photosensitive surface, such as the emulsion layer. of photographic film, is moved relative to the focussed, three-color beam as the optical power emitted from the lens is modulated in accordance with the print file. In some systems, the combination of red, green and blue is accomplished by temporal sequencing rather than optical combination, but the result is similar because exposure is accumulative. The scan printing method offers the greatest control for scan line straightness and position accuracy, both of which are necessary for accurate angular display of the information when placed behind the lenticular faceplate. A technique for providing the desired displacement of the image lines using the preferred scan printer is described in the related print spacing application previously mentioned.

From a practical point of view calculating the position of each image line for position d of FIG. 6 is very time consuming. In practice, it is more practical to determine the position of the center image line for the outermost lenticule that provides the maximum displacement and a positioning adjustment is provided for the entire set of image lines for each lenticule that provides a linear change or displacement between the sets. This linear adjustment results in a center image line for the lenticule in the center of the display being positioned at position i of FIG. 2. The center image line position or displacement for the sets between the center lenticule and the outermost lenticule changes linearly. An even more practical approach is to determine a desired displacement between a zero displacement and the maximum, and provide a displacement adjustment to all image line sets to the left and right of the center lenticule equal of the desired displacement.

The lenticular display that is constructed may be useful for either transmissive or reflective viewing. In either case, the recording media or material printed in the printing step 40 is developed and, as necessary, fixed, into an unalterable hard copy (i.e., a photographic material is developed into a print or transparency, an electrostatic copy is toned and heat fused, etc.). As shown in FIG. 3, the hard copy (print media 68) is subsequently affixed to a lenticular faceplate or overlay 64 comprised of a clear optical material (glass, plastic, etc.) having an array of generally convex refractive optical surfaces embossed or otherwise formed on the display side thereof. The faceplate or overlay 64 has a thickness, as measured to the hard copy surface, equivalent to the focal length of the refractive optical surfaces. Faceplates with lenticular densities ranging from 50 to 180 lenticules per inch can be obtained from Fresnel Technology Incorporated, Fort Worth, Tex. If the hard copy material is transparent, the assemblage is illuminated from the side opposite to the faceplate by using a light box of high equivalent color temperature and good uniformity. If the hard copy material includes an underlying light-reflective layer, the assemblage is illuminated from the viewing side of the faceplate by reflected light passing through the faceplate, reflecting from the reflective layer, and passing back through the image-containing hard copy material and the lenticular faceplate.

The method of affixing the developed film to the back of the lenticular faceplate or overlay 64 can be by mechanical clamping, such as using a spring-loaded decorative display frame; or by laminating the film to the faceplate with a transparent adhesive layer such as Sealeze OptiMount-UV as made by Seal Products, Inc. Naugatuck, Conn. When lamination is the method of affixing, the actual thickness of the lenticular faceplate should be made thinner than the lenticule focal length by the thickness of the adhesive layer.

Since alignment of the recorded image pattern to the lenticules is important, a multi-step manual process as follows can be used. 1. The print is loosely clamped in contact with the rear surface of the lenticular faceplate along one lateral edge. "Loosely clamped" implies that the print can be repositioned on the rear surface by a mechanical sliding force. 2. The print is repositioned until the alignment of the image is visually satisfactory. This may be facilitated by using a light table as a source of back illumination. 3. The clamping mechanism is tightened to prevent inadvertent repositioning of the film. 4. The affixing means is applied. If lamination is used, the print sheet is rolled back from the free edge and the adhesive layer inserted. The laminating rollers are then applied from the clamped edge first and the assemblage advanced toward the free edge. A suitable automated alignment method has been disclosed in the related aligning application previously discussed.

In the preferred embodiment, the adjustment of printing densities and lenticular densities is made in preference to the printing densities, but is not a limitation of this technique. For example, the LVT Film Recorder has a standard printing resolution option of RES 48 (or 48 lines/millimeter). If it is desired to display a specific number of different views such as 23, then this would indicate a faceplate or overlay with 53 lenticules/inch, such as sold as standard option by Fresnel Technology, would not be viewable at distances closer than 26.33 inches without displaying an image break within the view. However, if a special mold can be made with 53.13484 lenticules/inch, this image would be compatible with normal reading distance. The calculation to determine the proper lenticular pitch for a particular viewing distance is easily done using a spreadsheet, an example of which is set forth below.

| | | | |
|---|---|---|---|
| 1. | Print line density = RES>> | 48 | lines/mm |
| | | 1219.2 | lines/inch |
| | Line width (u) = | 0.00082 | inches/line |
| 2. | Picture Width >> W | 8 | inches |
| 3. | Lenticule Radius: | | |
| | r = t*(n−1)/n | | |
| | Thickness >> t | 0.095 | inch |
| | Refractive Index >> n | 1.53 | |
| | Radius: r | 0.032908 | inches |
| 4. | Lineset: k >> 23 lines/Lent | | |
| 5. | Nominal Lenticular Density: | | |
| | P = 1/(u * k) Lent/mm | | |
| | = (25.4*RES)/ k = | 53.0087 | Lents/inch |
| | Num lenticules in Display: | M = | 760 |
| | | P*W | |
| 6. | Maximum Half-Angle (within material): | | |
| | tan β = n/(2*t*P) | | |
| | Half angle: | 5.654828 | degrees |
| | Display angle: φ | 8.637848 | degrees |
| 7. | Minimum Viewing Distance >> | | |
| | D = W/(2*tan(φ)) | 26.33 | inches |
| 8. | Desired Min. Viewing Distance >> | 16 | inches |
| | Desired Display Angle: β | 15.65 | degrees |
| | Desired Internal Angle: β' | 10.16 | |
| 9. | Offset(k=M/2) = t * tan(β') = E | | |
| | Offset(380) = 0.017018 inches | | |
| 10. | Edge lenticule Number: M/ 380 | | |
| | M/2*[1/P)−(1/P')] = E | | |
| 11. | Corrected Lenticular Density | | |
| | P' = 1/[(E+(1/P')] | | |
| | P' = 53.13484 Lents/inch | | |

Molds with special lenticular densities such as determined above can be made by companies like Fresnel Technology when requested.

When multiple copies of any given image are wanted, the use of the electronic printing technique is not necessary for each and every copy. Contact prints can also be made from "master" images which are electronically printed. Contact printing is accomplished by mechanically clamping unexposed film emulsion against a developed film emulsion and exposing the assemblage to light passing through the developed film emulsion to the unexposed film emulsion. The unexposed film emulsion thereby becomes exposed in different amounts over its surface area inversely corresponding to the optical densities in the "master" image and can be chemically developed to render the image visible. Since it is desirable when contact printing to have the unexposed film emulsion in very close proximity to the developed film emulsion on the "master" image, it is necessary that the "master" image be printed with one left-to-right inversion of features, or as if often described, a mirror image. For the sake of convenience, it may also be desirable to print the "master" as a negative image so that high density areas of the image correspond to higher light levels in the original scene. These matters of image and density reversal are very easy to accomplish in the construction of electronic image files.

The present invention has been described with respect to adjusting viewing position for a lenticular type depth display. A person of skill in the art will recognize that the same techniques can be applied to barrier displays as well as integral displays.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for creating, from image lines to be displayed, a depth display including an overlay having projection fields, comprising the steps of:
   (a) selecting a minimum viewing distance for the display;
   (b) selecting positions of the image lines with respect to corresponding ones of said projection fields responsive to the selected minimum distance wherein the image lines produce visual fields and said visual fields are offset with respect to the corresponding ones of said projection fields;
   (c) fixing the image lines in a recording media responsive to the positions; and
   (d) abutting the overlay to the recording media.

2. A method as recited in claim 1, wherein the overlay is a lenticular overlay having lenticules for projecting the image lines and step (c) comprises fixing at least one of the image lines under one of the lenticules adjacent to the lenticule projecting the at least one of the image lines.

3. A method as recited in claim 2, wherein step (b) selects the positions responsive to a thickness and a lenticule pitch of the overlay and a number of image lines of different images for each of the lenticules for the display.

4. A method as recited in claim 1, wherein step (b) selects a maximum displacement of an image line at an edge of the display from a center line position and the positions of the image lines vary from the center image line position to a maximum displacement as the corresponding projection field varies from the center projection field to an edge projection field.

5. A method as recited in claim 1, wherein step (b) selects a maximum displacement of an image line at an edge of the display from a center line position and the positions of the image lines are displaced with respect to the center line by a fixed displacement distance greater than zero and less than or equal to the maximum displacement.

6. A method as recited in claim 1, wherein step (c) comprises printing a negative and contact printing an image produced by the negative on the recording media.

7. A depth image display, comprising:
an overlay including a projection field; and
a recording media abutting the overlay and including a visual field in which a plurality of image slices are fixed, the visual field being fixedly offset with respect to the projection field.

8. A display, as recited in claim 7, wherein said overlay is a lenticular overlay having lenticules, each lenticule projecting one of the plurality of image slices and at least one of the image slices being recorded under a lenticule adjacent to the lenticule projecting the at least one of the image slices.

9. An apparatus for producing a depth image, comprising:
image means for producing image lines for the depth images;
selecting means for fixedly positioning the image lines responsive to a minimum viewing distance; and
display means for displaying the image lines responsive to the fixed positions through a depth image overlay, wherein said display means includes:
a projection field for projecting the image lines; and
a visual field for fixedly recording the image lines, said visual field being offset with respect to the projection field responsive to the positions.

10. An apparatus as recited in claim 9 wherein the overlay comprises a lenticular overlay.

11. An apparatus as recited in claim 10, wherein the offset is selected in accordance with $$\text{offset} = ((M/2) * (k*u)) - [(M/2) * P']$$

$$P' = (k*u) - [f * \tan(') ) /(M/2))$$

$$' = \sin^{-1}((\sin/n))$$

$$= \arctan(w/(2*d))$$

where d is a minimum viewing distance, w is lenticule print width, f is a thickness of the lenticular overlay, k is a number of perspectives to be recorded per lenticule, u is a width of an image line of a perspective, M is a number of lenticules in the print width and n is an index of refraction of the overlay.

12. A method for selecting lenticular pitch for a desired viewing distance of a lenticular image, comprising the steps of:
(a) selecting a nominal lenticular pitch from a number of views and printer resolution;
(b) selecting an offset from the nominal lenticular pitch, lenticule thickness and a refracted angle; and
(c) selecting a lenticular pitch from the nominal lenticular pitch and the offset.

* * * * *